United States Patent [19]

Lynch

[11] Patent Number: 4,801,123
[45] Date of Patent: Jan. 31, 1989

[54] SUPPORT STAND FOR POLE-LIKE OBJECTS

[76] Inventor: James P. Lynch, 13 S. Field, Lakewood, Colo. 80226

[21] Appl. No.: 39,097

[22] Filed: Apr. 16, 1987

[51] Int. Cl.[4] ............................................. F16M 13/00
[52] U.S. Cl. .................................... 248/524; 248/529; 248/165; 248/150
[58] Field of Search ............... 248/524, 527, 529, 523, 248/558, 150, 165, 519; 47/40.5; D11/130.1; 211/205

[56] References Cited

U.S. PATENT DOCUMENTS

| | | | |
|---|---|---|---|
| 362,124 | 5/1887 | Thompson et al. | 248/215 |
| 830,671 | 9/1906 | Neff | 248/523 |
| 927,746 | 7/1909 | Murphy | 248/165 |
| 1,480,018 | 1/1924 | Siebenlist | 248/529 X |
| 1,806,600 | 5/1931 | Elderkin | 248/165 |
| 2,908,461 | 10/1959 | Coffeen | 248/524 X |
| 2,964,273 | 12/1960 | Butler | 248/524 |
| 3,310,180 | 3/1967 | Neagle | 248/165 X |
| 3,733,040 | 5/1973 | Rocquin | 248/524 |
| 4,222,559 | 9/1980 | Hammer | 248/188.5 X |
| 4,406,437 | 9/1983 | Wright | 248/529 |
| 4,712,758 | 12/1987 | Cuschera | 248/188.7 |

FOREIGN PATENT DOCUMENTS 303156  1/1918  Fed. Rep. of Germany ...... 248/523

Primary Examiner—Ramon S. Britts
Assistant Examiner—Karen J. Chotkowski
Attorney, Agent, or Firm—Timothy J. Martin; J. Preston Oxenham

[57] ABSTRACT

A support stand for a pole-like object includes a base member and a plurality of legs that slideably engage the base member at equiangularly aligned positions. Preferably the base member is tubular, and a primary leg is rigidly attached thereto. Two or more legs are rigidly attached to mounting sleeves that slide onto the tubular base into a nested position that presents a smooth visual appearance. Various alignment structures may be used to equiangularly align all of the legs. An upper end of the base member/leg assembly may be provided with adjustable clamping structure to further secure a received pole-like object; an auxillary base may also be used with the base member receiving a shank on the auxillary base which in turn receives the pole-like object.

21 Claims, 3 Drawing Sheets

U.S. Patent  Jan. 31, 1989  Sheet 1 of 3  4,801,123
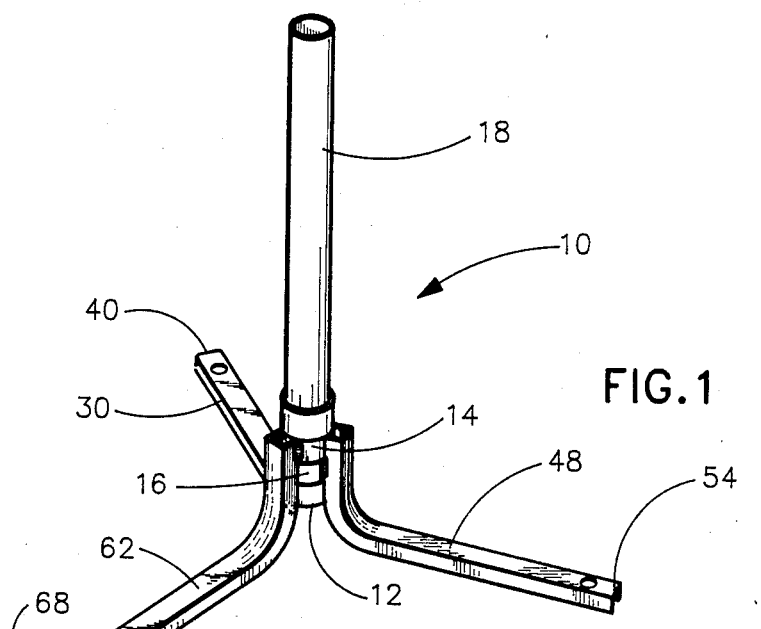
FIG. 1
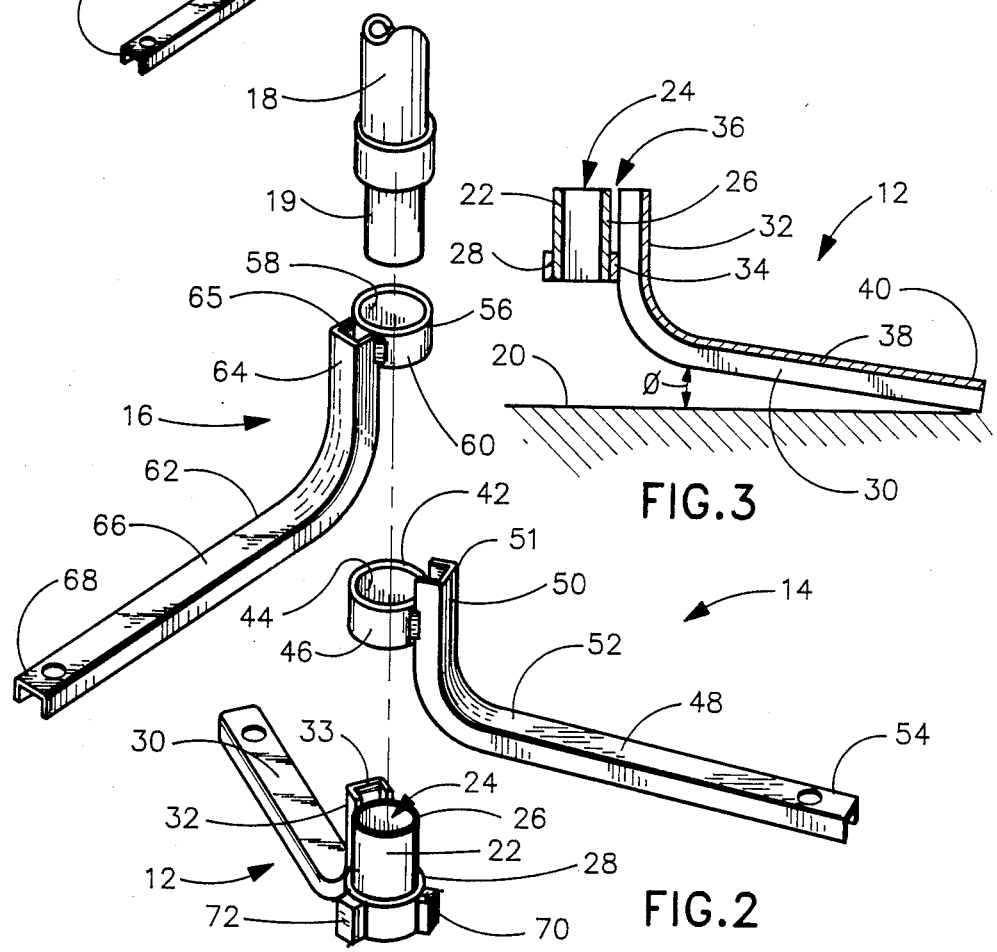
FIG. 3
FIG. 2

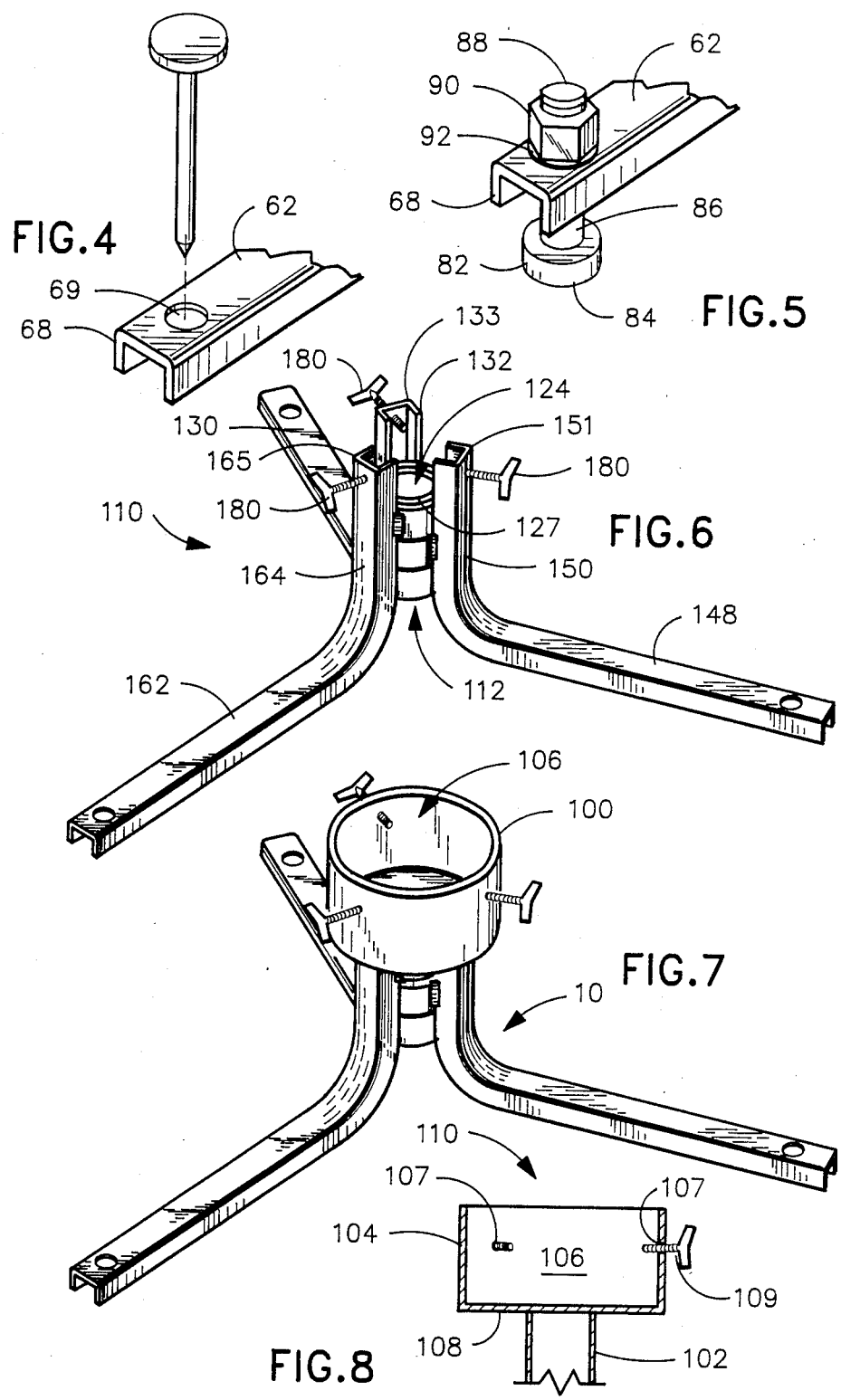

SUPPORT STAND FOR POLE-LIKE OBJECTS

BACKGROUND OF THE INVENTION

The present invention is directed to a support stand, and it particularly relates to stands which are adapted for releaseably retaining pole-like objects in a supported upright position on a support surface. Thus, the present invention contemplates a support stand for such objects as banner poles, flag poles, real and artifical Christmas trees, rally markers and the like. It is particularly useful in cooperation with a support structure for banners such as that described in may co-pending application, U.S. Ser. No. 859,637 filed May 5, 1986.

As was noted in my co-pending application, the use of pole-like supports for message displays, advertising displays for the support of national and regional flags, and as a support for banners and flags that represent groups, such as sport teams, delegations and the like are becoming increasingly more popular. Use of such structures is highly desired for both indoor and outdoor functions. Where a support pole requires a temporary mount rather than a permanent mount, it is desirable to have a sturdy yet compact support stand which may readily be assembled and disassembled as use of the support pole requires. This need is felt both where the support pole is a single integral unit and where it is a collapsible pole structure such as that shown in my copending application.

Prior art support stands for pole-like objects have included stands of a permanent nature as well as some portable stands. Permanently affixed stands include tubular pipes which are embedded in the ground or which are implanted in concrete bases that are either embedded in the ground or permanently affixed to another support surface. Other stands may, for all practical purposes, be considered permanent due to their physical mass since they are not readily moveable; again, these include, for example, cast concrete blocks. Other permanent stands include rigid metallic brackets that may be bolted to a support surface, such as a sidewalk, plaza and the like.

On the other hand, temporary stands for portable pole-like objects found in the prior art include the traditional Christmas tree stand wherein a plurality of radially outwardly projecting legs may be attached by screws to a cup-like container adapted to receive the stump of a Christmas tree. Artificial Christmas trees have a smaller base which may be telescopically received in a tubular base support. Also, temporary support stands include those having a plurality of folding legs attached to slide brackets with these legs being scissor actuated to move from a stored position to a support position. In my co-pending application, Ser. No. 859,637, a new and improved stand is described wherein a support pad abuts the support surface and a plurality of legs pivot downwardly to terminate in staked ends that engage the ground or in support pads located at an offset relationship with respect to the central pad.

Despite these prior art supports, there remains a need for a support stand that may be disassembled into a stored position which can readily and easily be assembled in a support configuration to positively support a polelike object on a support surface. There is a further need for such a support stand which may readily be used in indoor and outdoor applications and which may be adjustable to compensate for slight irregularities in the flatness of the support surface. There is a further need for a support stand which may be stored in a minimum amount of space and which may be used repeatedly over a course of time. There is a further need for a support stand of simplified structure that requires minimum assembly time without the need for assembly tools.

SUMMARY OF THE INVENTION

It is an object of the present invention to provide a new and useful support stand for pole-like objects which sturdily supports such objects upright on a support surface.

Another object of the present invention is to provide a portable support stand for pole-like objects which stand may easily be erected for use and subsequently disassembled without the need for assembly tools.

It is a further object of the present invention to provide an inexpensive support stand for pole-like objects such as banner poles, flag poles, displays, and the like which support stands may be positioned on a variety of generally horizontal support surfaces.

A still further object of the present invention is to provide a support stand for pole-like objects which is relatively adjustable to accommodate slightly uneven terrains so that the object is held in a vertically upright position.

According to the present invention, then, a support stand is provided which stand is adapted to receive and support a pole-like object in an upright position on a generally horizontal support surface. Broadly, this support stand includes a base member which has an open interior and an upper opening sized to receive a lower shank portion of a pole-like object. A plurality of legs are releaseably secureable to the base member so that the base member is supported in an upright position on the support surface such that a longitudinal axis of the base member is oriented in a vertical direction. A sliding engagement structure slideably and releaseably mounts the legs onto the base member to define an assembled position. Alignment structure aligns the legs at selected angularly spaced locations about the longitudinal axis of the base member whereby the legs will support the base member and the pole-like object.

Preferably, a primary leg is rigidly attached to the base member and two sliding legs may be slideably received on the base member. To this end, the base member is in the form of a tubular piece, and each of the sliding legs is secured to a mounting sleeve which slides onto the tubular piece. The primary leg is attached to the tubular member by means of a base sleeve that is sized similarly to the mounting sleeves, and each leg has an upper portion that is oriented longitudinally of the base member in the nested position. Thus, when the legs are assembled onto the base member, the mounting sleeves present a smooth cylindrical appearance for the base member with the legs having upper portions extending along the longitudinal surface of this cylindrical shape and then terminating in radially outwardly divergent portions that have free ends which engage the ground. Additional attachment means such as stakes or adjusting pads may be located at the free ends of each leg. Upper ends of the legs may terminate in a plane coextensive with the upper rim of the base member that describes the base member's opening. Alternately, these upper ends may extend above the plane of the opening and adjustable clamping means in the form of radially adjustable bolts may be provided. These bolts may be tightened onto a pole-like object placed within the base member. Further, an adapter base may be used where this adapter base has a lower shank portion that is engaged by the base member and an upper receptacle adapted to receive another pole-like object. Again, adjustable clamping structure may be provided on the receptacle. The shape of the base member and the mounting sleeve can take a variety of cross-sectional configurations. Likewise, the rotational angular alignment means can take on a variety of structures.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 a perspective view of the support stand according to the preferred embodiment of the present invention shown supporting a pole in a vertical position;

FIG. 2 is an exploded view in perspective of the support stand shown in FIG. 1;

FIG. 3 is a cross-sectional view of the base support and primary leg portions of the support stand shown in FIGS. 1 and 2;

FIG. 4 is a perspective view showing an end portion of one of the legs of the support stand for use with an attachment stake;

FIG. 5 is a perspective view of an end portion of the leg shown in FIG. 4 having an adjustment pad;

FIG. 6 is a perspective view of the invention shown in FIG. 1 showing a leg extension and mounting modification sheet;

FIG. 7 is a perspective view of the preferred embodiment of the present invention shown with an adapter base;

FIG. 8 is a side view in cross-section of the adapter base shown in FIG. 7;

DETAILED DESCRIPTION OF THE PREFERRED EMBODIMENT

Figure 9:
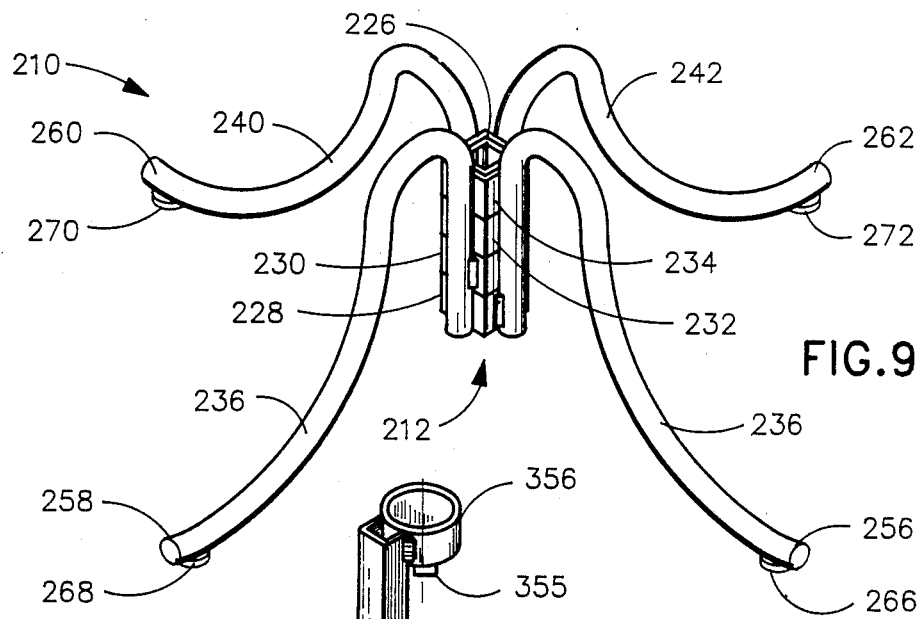
FIG. 9 is a perspective view of a first alternate embodiment of the present invention.

The present invention is directed to support stands in general and specifically to a support stand for pole-like objects. The support stand according to the preferred embodiment of the present invention is particularly adapted as a stand which may be easily erected for use and disassembled for storage without the need for tools. As such, the present invention is constructed to be particularly useful as a support stand for supporting pole-like objects on a generally horizontal support surface. Such objects include flag poles, banner poles, artificial and real Christmas trees, and other pole-like objects. Thus, it should be understood that the scope of this invention contemplates the supporting of any object that has a lower shank portion that may be mounted in a stand so that the object is held in an upright position.

Turning to the Figures, the preferred embodiment of the present invention is best shown in FIGS. 1 through 3. Here, support stand 10 includes a base assembly 12 and intermediate leg assembly 14 and an upper leg assembly 16. Support stand 10 is used to support a pole-like object, as represented by pole 18 on a support surface such as surface 20. As is shown in FIGS. 1–3, base assembly 12 is formed by a base member 22 in the form of a tube having an upwardly open mouth 24 having a surrounding upper rim 27. Mouth 24 is adapted to receive a lower shank portion 19 of pole 18 so that shank portion 19 is supported in the interior cavity 23 of base member 22. A lower portion of base member 22 is enlarged, and this is accomplished by having a lower portion of tube 26 telescopically received in and rigidly affixed to a base sleeve 28. Thus, it should be appreciated that base member 22 is formed by tube 26 and base sleeve 28 which are rigidly affixed to one another. A primary leg 30 is rigidly secured to base member 22. To this end, leg 30 has an upper leg portion 32 which is affixed to base sleeve 28 such as by welding or other attachment means at location 34. Upper leg portion 32 is oriented longitudinally of the base member in spaced parallel relation to the outer surface thereof, as is best shown in FIG. 3. Accordingly, a gap 36 is formed between outer portion and the surface of tube 22, with gap 36 having a radial width slightly greater than the radial thickness of the base sleeve 28 and mounting sleeves 42 and 56, discussed below. Leg 30 extends downwardly from upper leg portion 32 and is outwardly divergent to form a main leg portion 38 which projects laterally away from the base member and terminates at free end 40 which is adapted to rest on surface 20, as is shown in FIG. 3. As noted above, leg 30 is rigidly secured to sleeve 28 and to tube 26 which form base member 22. However, it is within the scope of this invention that leg 30 and sleeve 28 be affixed to one another as a leg assembly, similar to leg assemblies 14 and 16, and that this leg assembly be slideably mounted on the base assembly.

Intermediate leg assembly 14 is best shown in FIG. 2 and includes a mounting sleeve 42 which has an inner sleeve surface 44 and an outer sleeve surface 46. Sleeve 42 is sized to be slideably and mateably received on tube 26 of base member 22 so that it is in close-fitted engagement therewith to define an engaged position. A secondary leg 48 is rigidly mounted onto mounting sleeve 42 such as by welding or other attachment means known in the art. Leg 48 is identical in construction with leg 30 so that it has an upper leg portion 50 and a main leg portion 52 which extends downwardly from and projects laterally away from base member 22 in the nested position. Leg 48 terminates at a free end 54 which will engage the support surface 20. Likewise, upper leg assembly 16 includes a mounting sleeve 56 having an inner sleeve surface 58 and an outer sleeve surface 60. A secondary leg 62 has an upper leg portion 64 which is rigidly secured to mounting sleeve 56, again by welding or other attachment technique. Sleeve 56 is sized to be slideably and mateably received on tube 26 of base member 22 in the engaged position. Leg 62 includes a main leg portion 66 which extends downwardly and laterally outwardly of base member 22 in the engaged position so that it terminates in a free end 68 that engages mounting surface 20.

It should be appreciated from the foregoing that the construction of leg assemblies 14 and 16 are substantially the same and, indeed, are quite comparable to the construction of base assembly 12. As may be seen in FIG. 2, base sleeve 28 of base member 22 is identical with each of sleeves 42 and 56 and receive smaller diameter tube 26 therein Since each of upper leg portions 32, 50 and 64 are oriented longitudinally at the base member in the nested position, sleeves 42 and 56 slide onto tube 26 so that they are completely nested on base member 22 between tube 26 and upper leg portion 32 of leg 30. In order to present a uniform appearance, sleeve 56 is mounted on the uppermost end of upper leg portion 64 of leg 62. Sleeve 42 is then mounted downwardly on upper portion 50 of leg 48 a distance equal to the longitudinal length of sleeve 56. Similarly, sleeve 28 is mounted onto upper portion 32 of leg 30 a distance equal to the combined longitudinal lengths of sleeves 56 and 42. Thus, when in the engaged position shown in FIG. 1, the upper ends of legs 30, 48 and 62 are in a common plane transverse to the longitudinal axis of tube 26. Each of sleeves 42 and 56 are then nested within gap 36 between tube 26 and upper leg portion 32 of leg 30.

In order to prevent relative angular rotation of sleeves 42 and 56 and, correspondingly, legs 48 and 62, angular registration and retaining structure is provided. As is best shown in Figure 2, sleeve 28 of base member 22 is provided with radially outwardly projecting nubs 70 and 72 which are spaced with respect to each other and to upper leg portion 32 equiangularly about sleeve 28. Each of legs 30, 48 and 62 are formed as bent U-shaped channel pieces so that upper leg portions 32, 50 and 64, respectively, are formed as radially inwardly opening channel pieces. Thus, for example, as sleeve 42 is slid onto tube 46, upper leg portion 50 is oriented so that the inwardly opening channel of upper leg portion 50 slidingly engages nub 70. Similarly, as mounting sleeve 56 is slid onto tube 26, the inwardly opening channel of upper leg portion 64 slideably engages nub 72. The engagement of nubs 70 and 72, respectively, with the channels in upper leg portions 50 and 64 prevent rotation of base assembly 12, intermediate leg assembly 14 and upper leg assembly 15 about a longitudinal axis.

It can further be appreciated from the foregoing that tube 26 is sized so that it has an upper rim 27 which is in a common plane with upper ends 33, 51 and 65 of leg portions 32, 50 and 64, respectively. Thus, when in the nested position, mouth 24 is in the common plane of the upper ends of each of the support legs. The common internal radius and external radius of each of the mounting sleeves 42 and 56 as well as base sleeve 28 thus present a uniform cylindrical appearance for base member 22, as best shown in FIG. 1.

As noted above, pole 18 has a lower shank portion 19 that is received through mouth 24 into the interior of tube 26. To further position pole 18 on support stand 10, a positioning sleeve 21 is telescopically received onto pole 18 and is affixed thereto. Lower shank portion 19 thus comprises a smaller diameter tube that is telescopically received in tube 18 and affixed thereto. Since tube 19 is sized to he telescopically received on the interior of tube 26, tube 26 has a similar diameter with pole 18. Sleeve 21 thus has a common diameter with sleeves 28, 42 and 56 so that pole 18 may be telescopically received into mounting stand 10. Thus, it should be appreciated that tubular pole 18 can be used as an adapter to receive a flagstaff or other elongated pole-like member.

As is seen in FIGS. 1 through 3, and also in FIG. 4, each of legs 30, 48 and 62 are provided with holes at their respective free ends. Specifically, free end 40 of leg 30 is provided with an upwardly opening hole 41, free end 54 of leg 48 is provided with upwardly opening hole 55, and free end 68 of leg 62 is provided with upwardly opening hole 69. Each of these holes is provided to either receive a mounting stake or adjusting pad. By way of example, in FIG. 4, leg 62 is shown adapted to receive a stake 80 which may be placed through hole 69 and driven into the support surface. This is especially useful for outdoor use where it is desired to further secure mounting stand 10 to the ground. Where the stand 10 is used on a floor, hole 69 could receive a nail, bolt or other mounting element to secure leg 62 onto the floor. Such mounting structure would be then used for each of holes 41, 55, and 69.

Alternately, an adjustable pad structure may be provided. As is shown in FIG. 5, by way of example and not limitation, a threaded bolt 82 may be provided and positioned upwardly into hole 69. Bolt 82 has a lower support pad 84, a threaded shank 86 which extends through hole 62 to terminate at a threaded upper end 88 which threadably receives a nut 90 thereon. Leg 62 is connected to bolt and nut assembly 82,90 so that, as nut 90 is rotated, free end 68 of leg 62 moves upwardly and downwardly. Thus, this assembly provides a position adjustment between the free ends of each of the legs in the support surface so as to compensate for a slightly irregular support surface 20.

In operation, then, a user assembles support stand 10 by first mounting intermediate leg assembly 14 on base assembly 12 by telescopically engaging tube 26 with sleeve 42 with nub 70 engaging the channel on upper leg portion 50 of leg 48. When this engagement is completed, the user next takes upper leg assembly 16 and slideably mounts sleeve 56 in telescopic relation onto tube 26 with the channel of upper leg portion 64 engaging nub 72. This assembly may then be placed on support surface 20 and pole 18 may be mounted therein by placing tube 19 through mouth 24 so that lower leg portion 19 engages the interior of tube 26. Each of legs 30, 48 and 62 are slightly flexible and are curved at a large radius from its respective free end to a midportion thereof. Thus, as is shown in FIG. 3, leg 30 extends at a gently sloping curve at a large radius from free end 40 to a location adjacent its attachment point 34. Thus, a mid-portion of leg 30 is oriented at acute angle $\phi$ with respect to support surface 20 that is engaged by free end 40. Since leg 30 is slightly flexible, the weight of any pole-like object placed in support stand 10 will allow support stand 10 to flex and therefore automatically accommodate slight irregularities in the support surface. Further, it should be appreciated that the use of three legs for the support assembly is desired since free ends 40, 54 and 68 define a plane for support stand 10 as the three engaged points. However, any number of leg assemblies are contemplated within the scope of this invention. Since the free ends of each leg engage the support surface at a laterally offset location, the weight of the base member and the supported object create a bending moment on each leg that helps bind each mounting sleeve against longitudinal movement.

Turning to the modifications of the present invention, further mounting structure is shown in FIG. 6. Here, support stand 110 is constructed almost identically with support stand 10, described above. However, as is shown in FIG. 6, each upper leg portion 132, 150 and 164 of legs 130, 148 and 162 terminate at upper ends 133, 151 and 165, respectively. Again these upper ends are in a common plane. However, the transverse plane of upper ends 133, 151 and 165 is spaced above rim 127 so that each upper leg portion 132, 150 and 164 extends above the open mouth 124 of base assembly 112. Each of these upper leg portions is then provided with a threaded hole that receives adjusting wingheaded bolts 180 which may be advanced in the threaded hole in a radial direction. Thus, when a pole-like object is inserted into support stand 10, threaded bolts 180 may be operated to positively engage the pole assembly to further retain the pole assembly in releaseable connection to the support stand 110. This embodiment is particularly useful as a support stand for an artificial Christmas tree.

As is shown in FIGS. 7 and 8, base assembly 10 may be employed with an adapted base 100. Base 100 includes a lower shank 102 which is sized to telescopically fit through mouth 24 of base member 20. A cup-shaped receptacle 104 has an interior cavity 106 which has an enlarged diameter and which is sealed by plate 108 at its lower portion. A plurality of threaded bolts 109 extend through holes such as threaded hole 107 so that bolts 109 are radially advanced into and out of cavity 106. It should be appreciated that when adapter base 110 is mounted on support stand 10 a pole-like object having an enlarged base portion may be mounted onto the stand. This adapter is particularly useful for live Christmas trees so that, after the trunk of the tree is placed within cavity 106, bolts 109 are tightened to secure the tree therein. Water may then be added into receptacle 104 as is known in the art. Naturally, virtually any adapter base having a lower shank portion is within the scope of this invention.

An alternate embodiment of the support stand according to the present invention is shown in FIG. 9. Here, a support stand 210 is shown having a base assembly 212 that is square-shaped in cross-section so that a hollow square tube 226 replaces tube 26 of base assembly 12. Square-shaped sleeves 228, 230, 232 and 234 extend around tube 226 with square sleeve 228 preferably being rigidly secured thereto in a manner similar to sleeve 28 of the preferred embodiment described above. Four tubular legs 236, 238, 240 and 242 have longitudinal leg portions such that the longitudinal leg portions of legs 238, 240 and 242 are respectively attached to sleeves 230, 232 and 234. The mid-portion of legs 236, 238, 240 and 242 extend upwardly and downwardly to terminate, respectively, at free ends 256, 258, 260 and 262 that engage the support surface by pads 266, 268, 270 and 272. Each of the legs are fairly rigid but flex slightly to again allow for modestly uneven support surfaces. The square configuration of tube 226 and sleeves 228, 230, 232 and 234 provide the angular alignment of the legs in an equiangular position. Other polygonal shapes for the base member could be readily employed.

Figure 10:
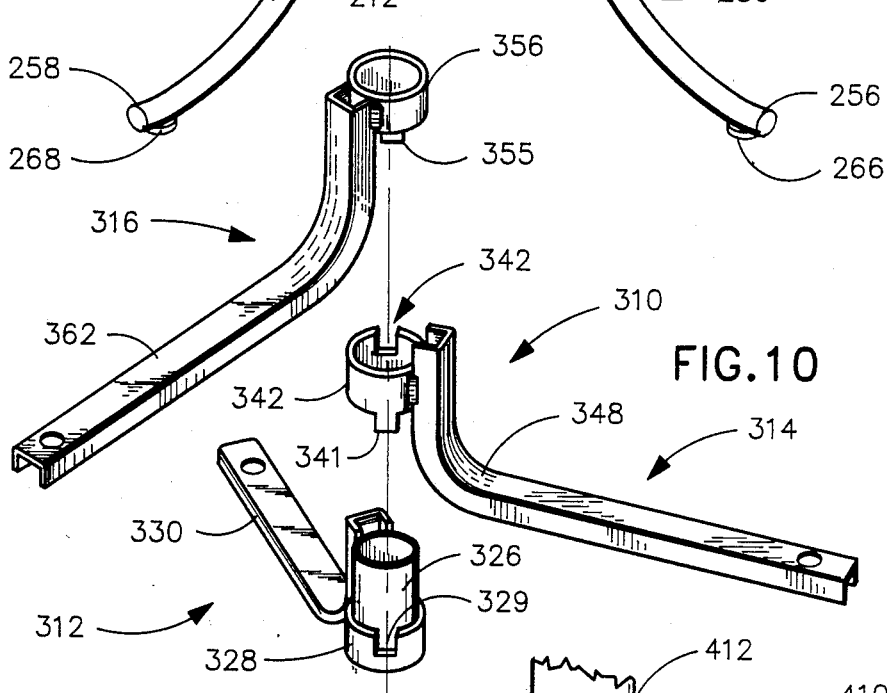
FIG. 10 is an exploded view in perspective of a second alternate embodiment of the present invention.
Figure 11:
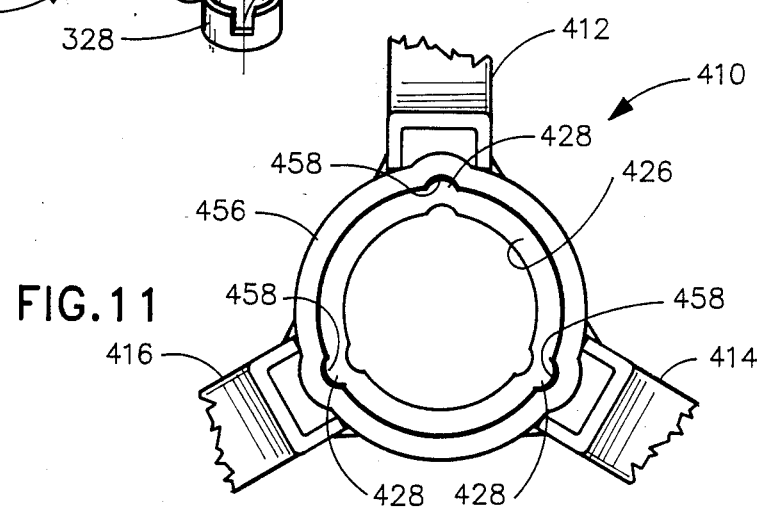
FIG. 11 a top plan view of a third embodiment of the present invention.

Alternate embodiments of the equiangular alignment means are shown in FIGS. 10 and 11. In FIG. 10, base assembly 312 includes a tube 326 that has a base sleeve 328 to which a leg 330 is attached. Intermediate leg assembly 314 includes a leg 348 that is attached to mounting sleeve 342, and upper leg assembly 316 has a leg 362 that is rigidly secured to a sleeve 356. As is shown in FIG. 10 sleeve 328 is provided with a slot 329 and sleeve 342 is provided with a mating tab 341 that is sized to engage slot 329. Thus, when sleeve 342 is positioned in telescopic nested position on tube 326, sleeve 342 may be rotated so that tab 341 engages slot 329 to properly align intermediate leg assembly 314 with respect to rotational angle. Similarly, then, sleeve 342 is provided with a slot 343, an sleeve 356 is provided with a tab 355 sized to engage slot 342. When sleeve 356 is nested onto 326, upper leg assembly 316 may be rotated so that tab 355 engages slot 342, thus aligning each of legs 330, 348 and 362 and equiangular positions about the longitudinal axis of the support stand 310.

In FIG. 11, support stand 410 is provided with a base member including a tube 426. Tube 426 has a plurality of equiangularly spaced ribs 428, and each sleeve, such as sleeve 456 is provided with a plurality of channels, such as channels 458, again at equiangularly spaced intervals around the inner surface of the mounting sleeve. Thus, when leg assemblies 414 and 416 are rotated with respect to base assembly 412, these channels and ribs mate to equiangularly align the leg assemblies with respect to the base assembly about the longitudinal axis.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A support stand adapted to receive and support a pole-like object in an upright position on a horizontal support surface, comprising:
    a base member having an open interior and an upper opening sized to receive a lower portion of said pole-like object;
    a primary leg rigidly attached to said base;
    a plurality of mounting sleeves telescopically slideable onto said base member to define an assembled condition;
    a plurality of first legs each attached to a respective mounting sleeve such that, when said mounting sleeves are in the assembled condition, said first legs support said base member in an upright position on said support surface with a longitudinal axis of the base member oriented in a vertical direction with said opening oriented parallel to said support surface; and
    alignment means for aligning said legs at selected angularly spaced locations about the longitudinal axis of the base member, said alignment means becoming operative as said first legs are slideably mounted on the base member to prevent relative angular movement of each of said first legs with respect to said base member.

2. A support stand according to claim 1 including adjustable clamping means associated with said base member for clamping said pole-like object therein.

3. A support structure according to claim 1 wherein each of said legs are outwardly and downwardly divergent in the assembled position such that each leg terminates in a free end which engages said support surface, each said leg having a mid-portion oriented at an acute angle to the support surface and being slightly flexible.

4. A support stand adapted to receive and support a pole-like object in an upright orientation on a support surface, comprising:
    a base member having an outer surface and an upper opening sized to receive a lower portion of said polelike object;
    a primary leg rigidly attached to said base member;
    a plurality of rigid mounting sleeves each having an inner sleeve surface and an outer sleeve surface, said mounting sleeves sized to be slideably and mateably received on said base member in close-fitted engagement therewith in an engaged position;
a plurality of secondary legs each of which being rigidly attached to a respective one of said mounting sleeves so that said respective ones of said mounting sleeves are operative to releaseably secure said secondary legs to said base member, each of said primary leg and said secondary legs having main leg portions projecting laterally away from said base member and terminating at a free end whereby said legs each have an end portion for engaging said support surface; and
alignment means for aligning said secondary legs angularly around said base member whereby said primary leg and said secondary legs are equiangularly spaced with one another.

5. A support stand according to claim 4 wherein said base member is cylindrical in shape having an upper rim, said mounting sleeves being tubular in shape and having an inner diameter slightly greater than the outer diameter of said base member.

6. A support stand according to claim 5 wherein said primary and secondary legs each include an upper leg portion that is oriented longitudinally of said base member in spaced parallel relation to the outer surface thereof.

7. A support stand according to claim 6 wherein said upper leg portions are spaced from said outer surface a distance slightly greater than the radial thickness of each mounting sleeve whereby said mounting sleeves are nested between said base member and said upper leg portions.

8. A support stand according to claim 7 wherein said primary leg is attached to stationary base sleeve which is rigidly attached in telescopic relation around a lower base portion of said base member, said stationary sleeve sized of a common internal radius and a common external radius with said mounting sleeves, said mounting sleeves nested one on top of the other and on top of said stationary sleeve to present a uniform cylindrical appearance.

9. A support stand according to claim 8 wherein said upper leg portions terminate at upper ends in a common transverse plane to the longitudinal axis of said base member.

10. A support stand according to claim 9 wherein said stationary sleeve and said mounting sleeves have a combined longitudinal length equal to the longitudinal length of said base member such that the upper most one of said mounting members has an upper edge located in a plane with said upper rim.

11. A support stand according to claim 10 wherein said upper rim is in said common transverse plane.

12. A support stand according to claim 10 wherein the plane of said upper rim is parallel to said common transverse plane and located between said common transverse plane and said support surface, and including radially adjustable clamping means on the upper leg portions for operatively engaging the lower portion of said pole-like object received in said base member.

13. A support stand according to claim 4 including an adapter base having a pole-like lower shank receivable in said base member and a receptacle sized to receive a lower portion of said pole-like object, said receptacle having an internal cross-sectional area greater than the internal cross-sectional area of said upper opening.

14. A support stand according to claim 13 wherein said receptacle is provided with radially adjustable clamping means for operatively engaging the lower portion of said pole-like object received therein.

15. A support stand according to claim 4 wherein said base member and each of said mounting sleeves has a regular polygonal cross-section such that said base member has a plurality of outer faces and said mounting sleeves have a plurality of inner faces which slide on said outer faces to define said alignment means 16. A support stand according to claim 4 wherein said base member is cylindrical, said alignment means including at least one longitudinal rib on the outer surface of said base member and a channel formed on the inne sleeve surface of each mounting sleeve, each said channel being sized to engage said rib.

17. A support stand according to claim 4 wherein said base member is cylindrical, said alignment means including at least one channel formed on the outer surface of the base member and a rib formed on the inner sleeve surface of each mounting sleeve, each rib being sized to engage said channel.

18. A support stand according to claim 4 wherein said primary leg is rigidly attached to a primary mounting sleeve which is rigidly attached to said base member, said alignment means including a longitudinally projecting tab sized to engage a longitudinally formed slot on each adjacent pair of said mounting sleeves.

19. A support stand according to claim 4 wherein said secondary legs have upper leg portions formed as radially inwardly opening channels and located in a longitudinal relation to said outer surface, said alignment means including radially outwardly projecting nubs equiangularly spaced with said primary leg and each other in the engaged position and sized to be slideably engaged by said inwardly opening channels to prevent relative rotation of said secondary legs.

20. A support stand according to claim 19 wherein said nubs are attached to said base member.

21. A support stand according to claim 19 wherein at least some of said nubs are attached to said mounting sleeves.

* * * * *